United States Patent [19]

Ejiri et al.

[11] Patent Number: 4,708,427
[45] Date of Patent: Nov. 24, 1987

[54] OPTICAL SUBMARINE CABLE CONNECTION

[75] Inventors: Yoshihiro Ejiri; Akira Nagai, both of Tokyo; Taiichiro Nakai, Fujisawa; Yasuhiko Niiro, Yokohama, all of Japan

[73] Assignee: Kokusai Denshin Denwa Kabushiki Kaisha, Tokyo, Japan

[21] Appl. No.: 736,463

[22] Filed: May 21, 1985

[30] Foreign Application Priority Data

May 25, 1984 [JP] Japan ............................ 59-104641

[51] Int. Cl.⁴ .............................................. G02B 6/36
[52] U.S. Cl. .................................................. 350/96.20
[58] Field of Search .................... 350/96.15, 96.20; 174/70 R, 70 S

[56] References Cited

U.S. PATENT DOCUMENTS

| | | | |
|---|---|---|---|
| 4,313,027 | 1/1982 | Vives | 174/70 S |
| 4,516,830 | 5/1985 | Guazzo | 350/96.21 X |
| 4,606,603 | 8/1986 | Cairns | 350/96.2 X |

FOREIGN PATENT DOCUMENTS

| | | | |
|---|---|---|---|
| 0198413 | 10/1984 | Japan | 350/96.2 |
| 0042719 | 7/1985 | Japan | 350/96.2 |

Primary Examiner—Eugene R. LaRoche
Assistant Examiner—James C. Lee
Attorney, Agent, or Firm—Robert J. Burns; Emmanuel J. Lobato

[57] ABSTRACT

An anchoring structure is disclosed for connecting to a casing of an optical submarine repeater or a cable joint box an optical submarine cable which is composed of a cylindrical pressure proof layer formed by a combination of three deformed metal wires of the same sectorial cross-section and disposed inside an insulator so that the pressure proof layer has centrally thereof a circularly-sectioned optical fiber unit housing space for housing an optical fiber unit formed by at least one optical fiber, a cable tensile-strength member formed by a plurality of tensile-strength wires disposed concentrically with the cylindrical pressure proof layer on the outside thereof and a metallic tape layer disposed in a cylindrical form outside the tensile-strength member to extend in its axial direction, the seam of the metallic tape layer being welded and the insulator being disposed outside the metallic tape layer. The anchoring structure of the present invention is composed of a conical anchor member having inserted therethrough at least the optical fiber unit in a through hole made in the conical anchor member along its axial direction, a conical member bearing metal means having a tapered hole conformable to the external configuration of the conical member and fixed to the casing with the tensile-strength wires held between the inner wall of the hole and the external surface of the conical member, and a cylindrical pressure proof layer anchoring mechanism for anchoring the cylindrical pressure proof layer to the conical member bearing metal means.

9 Claims, 10 Drawing Figures

OPTICAL SUBMARINE CABLE CONNECTION

BACKGROUND OF THE INVENTION

The present invention relates to an anchor structure for an optical submarine cable which is used for connecting an optical submarine cable, which has a cylindrical pressure proof layer formed by a combination of three deformed metallic wires of the same sectorial cross-section, to a repeater or for interconnecting such optical submarine cables.

A cable anchor portion is housed in a cable coupling which is attached to one end of the optical submarine cable. Since the interior of the cable coupling must be designed to prevent lead-in of the optical fiber unit and to prevent entering thereinto of water, it is required that the cable tensile-strength wire anchoring arrangement be small. Moreover, a cable joint box is employed for repairing the cable, and hence it has to be assembled on a repair ship in as short as possible time before a predictable weather change occurs. The reason for this is that it is very difficult to steer the repair ship for a long time in a manner to prevent that two cables rising up from the sea bottom of several thousand meters deep get entangled with each other.

In conventional cables using a three-split pipe of aluminum, the breaking strength of the three-split pipe is about 0.6 tons and can sufficiently be anchored with an adhesive which hardens at room temperature. For anchoring a three-split pipe or iron or steel which can sustan a tension 7.5 times larger than the the aluminum-made three-split pipe, however, the room-temperature hardening adhesive is insufficient and at least curing is needed for hardening which requires holding the adhesive at high temperatures for several hours for hardening it. But this is contradictory to the requirement of the above-mentioned short-time period for assembling.

BRIEF SUMMARY OF THE INVENTION

An object of the present invention is to provide a small and high performance anchoring arrangement so as to satisfy such a short-time assembly requirement as mentioned above.

In accordance with the present invention, there is provided an anchoring structure for an optical submarine cable for connecting the submarine cable to a casing of an optical submarine repeater or a cable joint box the optical submarine cable is known and is of the type composed of a cylindrical pressure proof layer formed by a combination of three deformed metal wires of the same sectorial cross-section and disposed inside an insulator so that the pressure proof layer has internally and centrally thereof a circularly-sectioned optical fiber unit housing space for housing an optical fiber unit formed by at least one optical fiber, a cable tensile-strength member formed by a plurality of tensile-strength wires disposed concentrically with the cylindrical pressure proof layer on the outside thereof and a metallic tape layer disposed in a cylindrical form outside the tensile-strength member to extend in its axial direction, the seam of the metallic tape layer being welded and the insulator being disposed outside the metallic tape layer. The anchoring structure comprises a conical member comprising a tapered conical anchor member having inserted therethrough at least the optical fiber unit of the submarine cable, in a through hole made in the conical member along its axial direction, a conical member bearing metal means or bearing member having a tapered hole corresponding to the external configuration of the tapered outer surfaces of the conical member and fixed to the casing with the tensile-strength wires held between the inner wall surfaces of the hole and the external tapered surface of the conical member, and a cylindrical or tubular pressure proof layer anchoring mechanism or structure for anchoring the cylindrical pressure proof layer to the conical member bearing metal means.

In an embodiment of the present invention, the cylinrrical pressure proof layer anchoring structure includes a screw portion on the end portion of the cylindrical pressure proof layer for threaded engagement with a nut to directly or indirectly anchor the nut to the conical member bearing metal means.

In another embodiment of the present invention, the cylindrical pressure proof layer anchoring mechanism or structure includes a second conical anchor member for holding the cylindrical pressure proof layer between an inclined or tapered conical interior surface of the conical member made inside it as bearing means and the second conical anchor member.

In another embodiment of the present invention, the cylindrical pressure proof layer anchoring mechanism or structure includes grooves cut in the outer inclined conical or tapered surface in the conical anchor member for receiving the pressure proof layer so that the tensile-strength wires disposed around it and the pressure proof layer are held together between the conical member which is an anchor member and the conical interior section of the conical member bearing metal means.

In still another embodiment of the present invention, the cylindrical pressure proof layer anchoring mechanism or structure includes spacers of a metallic material and of the same thickness as the pressure proof layer of the cable and disposed around the conical member at equal intervals to lie between the three deformed metallic wires of the pressure proof layer so that the tensile-strength wires disposed around the pressure proof layer and the spacers and the pressure proof layer are held in assembly together between the conical member and the conical member bearing metal means.

BRIEF DESCRIPTION OF THE ACCOMPANYING DRAWINGS

The present invention will be described in detail below with reference to the accompanying drawings, in which.

DETAILED DESCRIPTION OF PREFERRED EMBODIMENTS

At first, an example of the optical fiber submarine cable will first be described.

Figure 1:
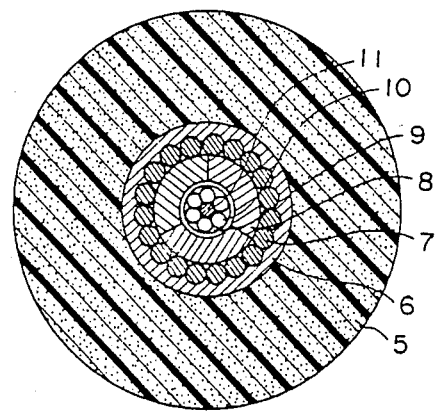
FIG. 1 is a cross-sectional view showing the structure of an optical submarine cable to which the present invention is applied.

As a result of its laying and recovery experiments conducted in a sea area 7,000 m deep, this kind of optical fiber submarine cable has turned out to have excellent optical, electrical and mechanical characteristics. FIG. 1 shows the cross-section of the optical submarine cable to which the present invention is applied. Reference numeral 5 indicates a cable insulator, 6 a copper tube formed by welding a copper tape in its lengthwise direction and squeezing it, 7 tensile-strength wires, 8 sectorial-sectioned deformed metallic wires (hereinafter referred to as the three-split pipe), 9 an optical fiber unit, 10 an optical fiber core and 11 a central tensile-strength wire of the optical fiber unit. According to the trial manufacture of cables conducted so far, the total DC resistance of about $0.4\Omega$ of the three-split pipe 8 and the copper tube 6 is provided per kilometer of optical submarine cable by using aluminum for the three-split pipe, permitting the reduction of feed voltage to a repeater.

On the other hand, an optical submarine cable construction plane has been made of cover middle- and short-distance routes of 1,000 to 2,000 km or so. In the cases of such middle- and short-distance routes, limitations on the DC resistance are lightened and the three-split pipe or iron or steel (the DC resistance of the cable is 0.6 to 0.7 $\Omega/Km$) will also satisfy the requirement. Further, since the trial manufacture of cables has indicated the prospect that the three-split pipe of more than 50 km long can be fabricated, the three-split pipe does not pose any problem in the manufacture of cables.

Next, assuming that the tensile strength of aluminum to be 20 Kg/mm$^2$ in the case of producing the three-split pipe of 3.0 mm at the inner diameter and of 7.0 mm at the outer diameter, the tensile breaking strength of the aluminum three-split pipe is about 0.6 tons. On the other hand, when iron or steel is used for the three-split pipe, since the pipe is strengthened by work hardening, its tensile strength is 150 Kg/mm$^2$ or so and its tensile breaking strength reaches as large as about 4.7 tons. If sixteen piano wires of 1.7 mm in diameter are used as the tensile-strength wire of the cable, then its tensile breaking strength is about eight tons and the entire tensile breaking strength of the cable is approximately 12.7 tons. Accordingly, the tensile breaking strength of the three-split pipe accounts for about 40% of the tensile breaking strength of the entire cable, and in order to transfer the entire tension force of the cable to repeaters and cable joint boxes, the three-split split pipe must be anchored.

However, the conventional structure has the above mentioned defects.

The present invention will hereinafter be described in detail.

FIGS. 2A to 4B illustrate embodiments of the present invention.

Figure 2A:
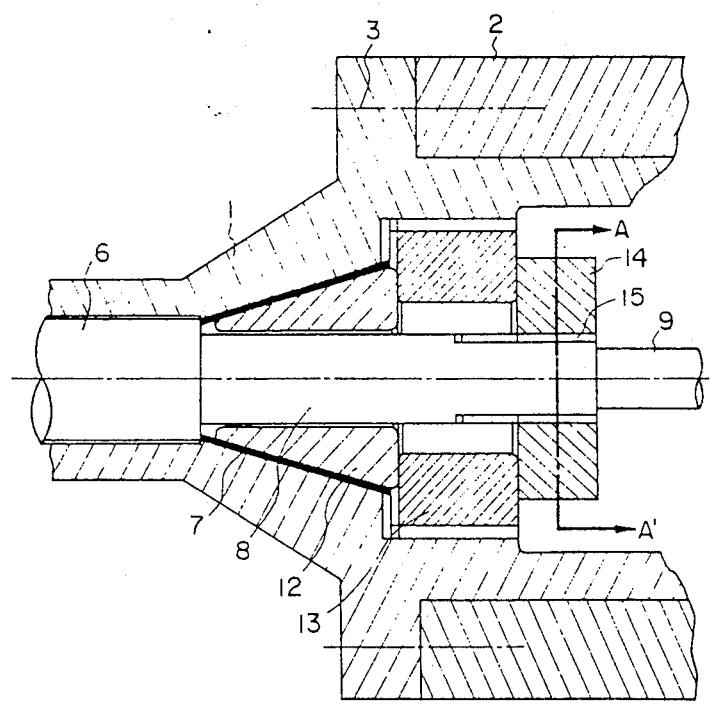
FIG. 2A is a longitudinal section illustrating an embodiment of the present invention.
Figure 2B:
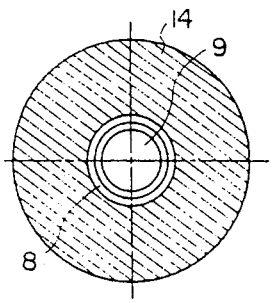
FIG. 2B is a section along a line A—A' in FIG. 2A.

In FIGS. 2A and 2B, reference numeral 1 indicates a conical member bearing metal means, 2 a tubular cylinder, 6 a copper tube, 7 a cable tensile-strength wire, 8 a three-split pipe, 12 a conical member which is an anchor member, 13 a conical member fixing nut, 14 a three-split pipe anchoring nut, 15 a screw portion for clamping the nut 14 with the three-split pipe 8, and 3 a screw (not shown) for fixing the tubular cylinder 2 with the conical member bearing metal means 1.

With the anchor structure shown in FIGS. 2A and 2B, the conical member 12 is provided which has inserted therethrough a stripped end portion of the cable as shown, the three-split pipe 8 from its apex received by a through bore bored through the conical member along its axis. The conical member fixing nut 13 is thread-mounted on the conical member bearing metal means 1 while the cable tensile strength wires 7 are held between the inner wall of a tapered or conical hole of the conical member bearing metal means 1, which has a conical interior section which conforms to the external shape of the conical member 12, and the external tapered or conical surface of the conical member 12 and while the conical member 12 is an anchor member urged or wedged into the hole of the axial conical bore or conical member bearing means 1 underlying the tensile wire layer as by hydraulic pressure machine. Next, the nut 14 is threadedly engaged with the screw portion 15, by which the three-split pipe 8 can be anchored on the conical member bearing means 1 indirectly through the conical member fixing nut 13. Thus, both the cable tensilte-strength wires 7 and the three-split pipe 8 can be anchored with a small and simple structure. It is understood of course that the stripped end portion of the cable is stripped as shown and the insertion of a tapered anchor member between layer is from the end of the cable.

Figure 3A:
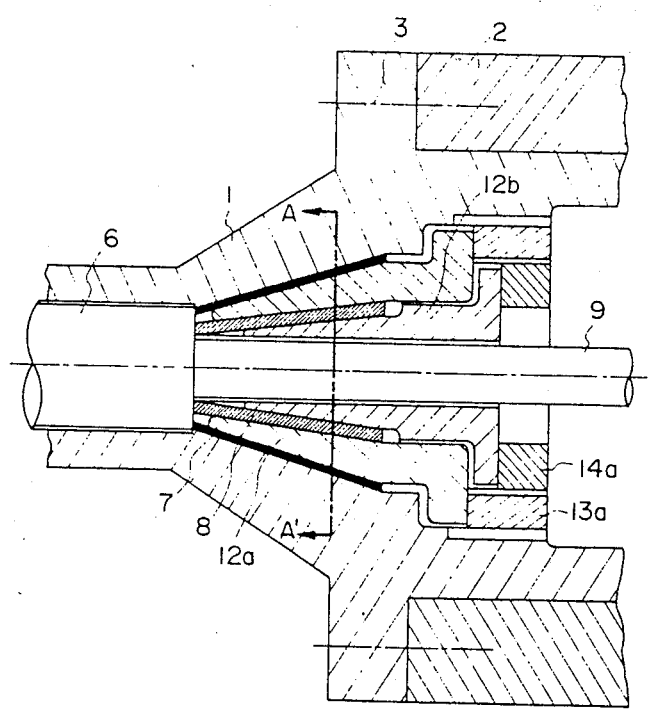
FIG. 3A is a longitudinal section illustrating another embodiment of the present invention.
Figure 3B:
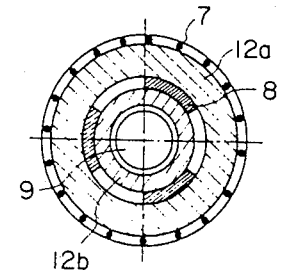
FIG. 3B is a section along a line A—A' in FIG. 3B.

FIGS. 3A and 3B illustrate another embodiment of the present invention, in which the cable tensile-strength wires 7 and the three-split pipe 8 are held between a conical member 12a and the conical member bearing metal means 1 and between both conical members 12a and 12b, respectively. In this case, a through hole bored through the inner conical member 12b along its axis passes therethrough only the optical fiber unit 9 since the cable end portion is stripped as shown. Reference numerals 13a and 14a indicate nuts which are threaded-mounted to the conical member bearing metal means 1 in that order with the conical members 12a and 12b urged or inserted between cable layers by hydraulic pressure machine or the like.

Figure 4A:
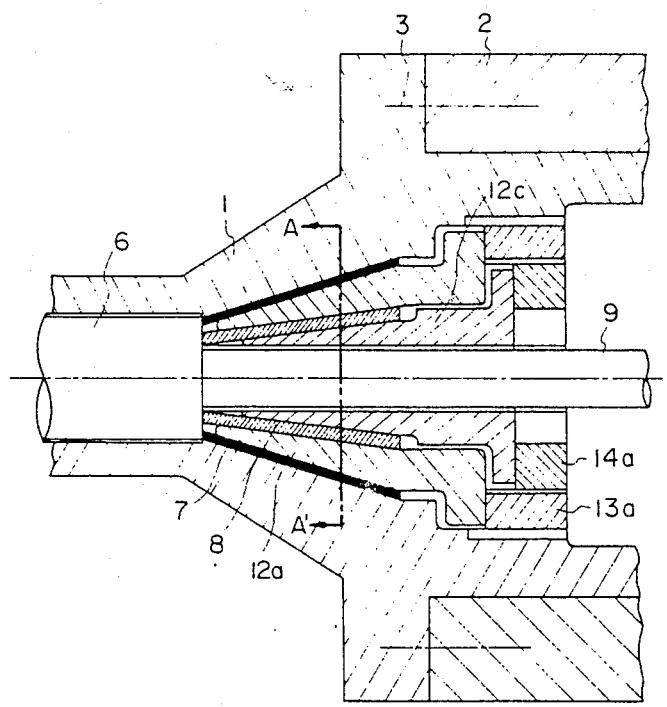
FIG. 4A is a longitudinal section illustrating another embodiment of the present invention.
Figure 4B:
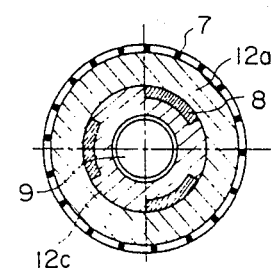
FIG. 4B is a section along a line A—A' in FIG. 4A.

FIGS. 4A and 4B illustrate a modified form of the embodiment shown in FIGS. 3A and 3B. In this case, the outer surface of an inner conical member 12c has cut therein axial grooves for receiving the three sectors of three-split pipe 8, allowing ease in positioning the three-split pipe 8. In either case, the present invention provides a small and efficient anchor structure for the cable tensile-strength wires 7 and the three-split pipe 8.

Figure 5A:
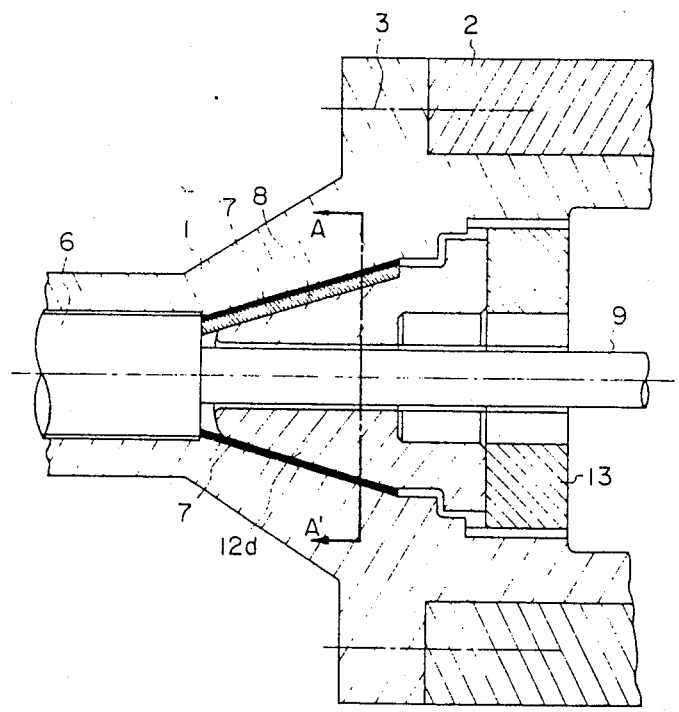
FIG. 5A is a longitudinal section illustrating further embodiment of the present invention.
Figure 5B:
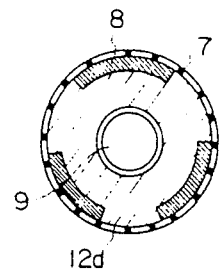
FIG. 5B is a section along a line A—A' in FIG. 5A.
Figure 6:
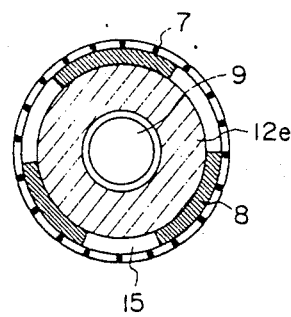
FIG. 6 is a cross-section explanatory of another embodiment of the present invention.

FIGS. 5A and 5B illustrate another embodiment of the present invention, in which the cable tensile-strength wires 7 and the three-split pipe 8 are anchored together by a conical member 12d and the conical member bearing metal means 1. The outer surface of the conical member 12d has cut therein grooves for receiving the three-split pipe 8, facilitating the anchoring work. This embodiment can also be modified as shown in FIG. 6, in which no grooves are cut in the outer surface of a conical member 12e but instead a spacer 15 is inserted between adjacent two wires of the three-split pipe 8, thereby facilitating machining the conical member 12d to cut down the costs of the cable.

(MERITS OF THE INVENTION)

As will be appreciated from the above-described structures, the present invention provides the following merits:

(i) Both the cable tensile-strength wires and the iron- or steel-made three-split pipe can be anchored with a small and efficient structure.

(ii) Since no adhesive is used, no curing is involved, so anchoring can be achieved in a short time.

(iii) Since no adhesive is used, the anchor structure is high in mechanical reliability and inexpensive.

As has been described above, the present invention offers a small and high performance optical submarine cable anchor structure with which tensile-strength wires and a three-split pipe of an optical submarine cable of the type having incorporated therein the iron- or steel-made three-split pipe as a pressure proof layer can be connected to a repeater or a cable joint box.

What we claim is:

1. A cable anchoring structure for connecting an optical submarine cable to an optical submarine repeater or optical cable connecting joint box or the like having a metallic casing, the submarine cable being of the type having a core optical unit housing at least one optical fiber longitudinally therein, multiple layers about the core optical fiber unit comprising a pressure proof layer about the core optical fiber unit consisting of a longitudinally split metallic conductive pipe split into three sectors cross sectionally, a layer of a multiplicity of tensile-strength wires disposed circumferentially about the metallic conductive pipe and a metallic tape welded defining a tube over the wires circumferentially thereof and an outer insulator layer, the cable when prepared for connection having an end portion stripped to the layer of tensile-strength wires, the cable anchoring structure comprising a tubular bearing member connected in use to said casing and having a conical interior section for receiving the stripped end portion of the cable inserted therein extending therethrough, the conical interior section having conical inner surfaces converging axially in a direction axially away from the stripped end portion of the cable when said stripped end portion of the cable is inserted into the conical interior section, a tapered anchor member insertable wedged in the conical interior section of the bearing member and having a central axial bore for insertion of the stripped end portion of the cable therethrough and having tapered outer surfaces converging toward the cable and axially in a direction of convergence of the inner surface of the conical interior section when inserted axially into said conical interior section, the tapered anchor member being insertable into the conical interior section axially under pressure between layers of the stripped end portion of the cable for separating at least the layer of tensile-strength wires from other underlying layers of the stripped end portion of the cable deforming the tensile-strength wires so that they overlie outer surfaces of the tapered anchor member and are held between the tapered anchor member outer surfaces and the inner surfaces of said conical interior section thereby fixing the cable to a casing, an anchor nut through which the stripped end portion of the cable is insertable, the anchor nut having an external thread for threading thereof on an internal thread of the bearing member in position for mounting the anchor nut abutting the tapered anchor member and holding it axially wedged in position in the conical interior section of the bearing member to preclude axial movement thereof axially away from the inner surfaces of the conical interior section of the bearing member thereby holding the layer of tensile-strength wires securely between said tapered outer surfaces and said conical inner surfaces.

2. A cable anchoring structure according to claim 1, including a lock nut for insertion of the stripped end portion of the cable therethrough and positioned in the bearing member for locking the anchor member and anchor nut in assembly.

3. A cable anchoring structure according to claim 2, in which said lock nut is internally threaded for threading on a thread on said layer comprising said pressure proof layer pipe.

4. A cable anchoring structure according to claim 1, including another tapered anchor member having an axial bore for insertion of the stripped end portion of the cable therethrough and insertable under pressure between the pressure proof layer corresponding to said pipe and said optical fiber unit concentrically with the first-mentioned tapered anchor member in centrically with the first-mentioned tapered anchor member in the axial bore thereof deforming the sectors of the end portion of said pipe so that they overlie outer surfaces of said second tapered anchor member and are clamped between the outer surfaces of said second tapered anchor member and surfaces defining said axial bore of the first-mentioned tapered anchor member, the anchor nut having an internal diameter for allowing said second tapered anchor member to be inserted axially extending therethrough and having an internal diameter, and a second nut through which the stripped portion of the cable extends and having a peripheral thread for threading thereof on the internal thread of the anchor and in position to abut against said second tapered anchor member maintaining it axially in position.

5. A cable anchoring structure according to claim 4, in which said second tapered anchor member comprises axial grooves on the outer surfaces thereof for each receiving a corresponding sector of said pressure proof layer constituting said pipe.

6. A cable anchoring structure according to claim 1, in which said tapered anchor member is insertable axially under pressure between the layers of the stripped end portion in a position with the outer surfaces thereof underlying the three sectors of said pressure proof layer, the tensile-strength wires and the three sectors being deformed by the tapered outer surfaces flared in a direction away from the remainder of the cable underlying the pressure-proof layer.

7. A cable anchoring structure according to claim 6, in which said tapered outer surfaces of the tapered anchor member comprise three axial grooves in which the three sectors of the pressure proof layer are received individually extending therein.

8. A cable anchoring structure according to claim 6, including metallic spaces insertable between next adjacent sectors of the pressure proof layer when the conical anchor member is inserted into the cable stripped end portion.

9. A cable anchoring structure for connecting an optical submarine cable to an optical submarine repeater or optical cable connecting joint box or the like having a metallic casing, the submarine cable being of the type having a core optical unit housing at least one optical fiber longitudinally therein, multiple layers about the core optical fiber unit comprising a tensile-strength layer, and an outer insulator layer, the cable when prepared for connection having an end portion stripped to the tensile-strength layer, the cable anchoring structure comprising a tubular bearing member connected in use to said casing and having a conical interior section for receiving the stripped end portion of the cable inserted therein extending therethrough, the conical interior section having conical inner surfaces converging axially in a direction axially away from the stripped end portion of the cable when said stripped end portion of the cable is inserted into the conical interior section, a tapered anchor member having an axial bore for insertion of the stripped end portion of the cable therethrough and having tapered outer surfaces insertable between layers of the cable end portion converging toward the cable and axially in a direction of convergence of the inner surface of the conical interior section when inserted axially into said conical interior section, the tapered anchor member being insertable into the conical interior section axially under pressure disposed between layers of the stripped end portion of the cable for separating at least the tensile-strength layer of tensile from other underlying parts of the stripped end portion of the cable deforming the tensile-strength layer so that it overlies outer tapered surfaces of the tapered anchor member and is held between the tapered anchor member outer surfaces and the inner surfaces of said conical interior section thereby fixing the cable to a casing, and an annular anchoring means through which the stripping end portion of the cable is insertable, the anchoring means having an external thread for threading thereof on an internal thread of the bearing member in position for mounting the anchor means abutting the tapered anchor member and holding it axially wedged in position in the conical interior section of the bearing member to preclude axial movement thereof axially away from the inner surfaces of the conical interior section of the bearing member thereby holding the tensile-strength layer securely between said tapered outer surfaces and said conical inner surfaces.

* * * * *